(12) United States Patent
Svensson et al.

(10) Patent No.: US 8,176,732 B2
(45) Date of Patent: May 15, 2012

(54) EXHAUST AFTERTREATMENT SYSTEM

(75) Inventors: Kenth I. Svensson, Hagerstown, MD (US); Moataz Ali, Gothenburg (SE)

(73) Assignee: Mack Trucks, Inc., Greensboro, NC (US)

( * ) Notice: Subject to any disclaimer, the term of this patent is extended or adjusted under 35 U.S.C. 154(b) by 172 days.

(21) Appl. No.: 12/598,358

(22) PCT Filed: May 1, 2008

(86) PCT No.: PCT/US2008/005612
§ 371 (c)(1), (2), (4) Date: Oct. 30, 2009

(87) PCT Pub. No.: WO2008/137028
PCT Pub. Date: Nov. 13, 2008

(65) Prior Publication Data
US 2010/0132342 A1  Jun. 3, 2010

(51) Int. Cl.
*F01N 3/02* (2006.01)
(52) U.S. Cl. ........... 60/320; 60/287; 60/297; 60/301; 60/311
(58) Field of Classification Search ............ 60/286, 60/287, 295, 297, 298, 301, 303, 311, 320
See application file for complete search history.

(56) References Cited

U.S. PATENT DOCUMENTS

| | | | |
|---|---|---|---|
| 3,892,536 A | 7/1975 | Roeser | |
| 4,905,470 A | 3/1990 | Reichle | |
| 5,158,753 A * | 10/1992 | Take et al. | 422/173 |
| 5,822,977 A * | 10/1998 | Fukuda et al. | 60/274 |
| 6,314,722 B1 * | 11/2001 | Matros et al. | 60/274 |
| 6,871,489 B2 * | 3/2005 | Tumati et al. | 60/285 |
| 6,935,105 B1 * | 8/2005 | Page et al. | 60/298 |
| 7,162,861 B2 | 1/2007 | Khair | |
| 7,797,928 B2 * | 9/2010 | Friedrich et al. | 60/284 |
| 8,015,802 B2 * | 9/2011 | Nishiyama et al. | 60/286 |
| 2006/0096282 A1 | 5/2006 | Friedrich | |

* cited by examiner

*Primary Examiner* — Thomas Denion
*Assistant Examiner* — Diem Tran
(74) *Attorney, Agent, or Firm* — Martin Farrell; Michael Pruden

(57) ABSTRACT

An apparatus for treating engine exhaust gas includes comprising an exhaust conduit for leading exhaust gases from an engine to an outlet, a particulate filter connected in the exhaust conduit to receive exhaust gas, a heat source connected in the exhaust conduit upstream of the particulate filter, and, a heat exchanger connected to receive exhaust gas exiting the particulate filter and arranged to heat a portion of the exhaust conduit upstream of the heat source and particulate filter. Heating the exhaust gases prior to entry into the particulate filter helps ensure oxidation of the trapped particulate matter.

10 Claims, 1 Drawing Sheet

EXHAUST AFTERTREATMENT SYSTEM

FIELD OF THE INVENTION

The invention relates to apparatuses and methods for treating internal combustion engine exhaust to remove pollutants. More particularly, the invention relates to an apparatus and method for removing $NO_x$ and particulate matter from an exhaust stream of a diesel engine and for operating such a system.

BACKGROUND AND SUMMARY OF THE INVENTION

With increasingly strict regulation of engine emissions, the use of exhaust treatment devices has increased over the past several years. These devices include filters (e.g., diesel particulate filters or DPF) to trap particulate matter and devices to trap or convert nitrogen oxides (NOx) to less harmful gases. As is known, DPF devices must be regenerated to avoid excessive accumulation of particulate matter in the device. To avoid removing the DPF for cleaning, it is convenient to regenerate the DPF in place by burning or oxidizing the particulate matter. When the engine is operated at high load, the temperature of the exhaust gas exiting the engine may be sufficiently high to cause burning of the particulate matter in the DPF, particularly if the DPF includes a catalytic coating for converting NO in the exhaust stream to $NO_2$ to facilitate $NO_2$ based regeneration of the particulate matter.

The following publications are representative of existing technology and are incorporated herein by reference for the content of their disclosures.

U.S. Pat. No. 4,902,487 to Cooper et al. discloses an exhaust treatment arrangement including a catalyst to convert NO to $NO_2$ upstream of a particulate filter to trap particulate matter. The $NO_2$ reacts with the trapped particulate matter to oxidize it and keep the filter relatively clean of trapped matter.

U.S. Pat. No. 5,746,989 to Murachi et al. discloses an apparatus including a catalyst to convert NO to $NO_2$, a diesel particulate filter to trap particulate matter, the $NO_2$ being introduced to the particulate filter to oxidize trapped particulate matter, and an NO trap downstream of the particulate filter to absorb NOx from the gas stream.

U.S. Pat. No. 6,662,553 to Patchett et al. discloses a system for the selective catalytic reduction (SCR) of NOx in an exhaust gas stream by the use of urea as a reductant. The document includes a discussion of various known methods of reducing NOx in gas streams.

U.S. Pat. No. 6,805,849 to Andreasson et al. discloses an apparatus for removing NOx and particulate matter from an exhaust gas stream including an oxidizing catalyst for converting NO to $NO_2$, a particulate filter downstream of the oxidizing catalyst, whereby the $NO_2$ thus provided to the particulate filter oxidizes the particulate matter to remove it from the filter, and an SCR device downstream of the particulate filter to convert $NO_x$ exiting the particulate filter to water and $N_2$ by reaction with ammonia in the presence of a catalyst.

United States Patent Application Publication No. 2006/0196176 by Karlsson et al., which is owned in common with the present application, discloses an apparatus for adjusting the temperature of exhaust gas from an engine, including an oxidation catalyst connected to receive exhaust gas from an engine, diesel particulate filter downstream of the oxidation catalyst, and a heat exchanger connected upstream of the oxidation catalyst in the exhaust flow and connected to receive the flow exiting the diesel particulate filter. The heated flow from the regeneration of particulate in the diesel particulate filter loops back to heat the engine exhaust flow before it enters the oxidation catalyst.

The invention provides an apparatus for treating engine exhaust gas, comprising an exhaust conduit for leading exhaust gases from an engine to an outlet, a particulate filter connected in the exhaust conduit to receive exhaust gas, a heat source connected in the exhaust conduit upstream of the particulate filter, and a heat exchanger connected to receive exhaust gas exiting the particulate filter and arranged to heat a portion of the exhaust conduit upstream of the heat source and particulate filter.

According to one embodiment, the heat exchanger comprises a pipe surrounding the particulate filter, the heat source, and the portion of the exhaust conduit upstream of the heat source and particulate filter, the pipe receiving exhaust gas exiting the particulate filter and guiding the exhaust gas to flow in heat exchanging contact with the particulate filter, the heat source, and the portion of the exhaust conduit.

The exhaust conduit includes a further portion downstream of the pipe to guide exhaust gas exiting the pipe to the outlet.

According to an alternative embodiment, the heat exchanger comprises a housing having a first inlet to receive exhaust gas from the engine and a first outlet connected upstream of the heat source, and having second inlet to receive exhaust gas exiting the particulate filter and a second outlet connected to the exhaust conduit, the heat exchanger configured to put the exhaust gas entering the second inlet in heat transfer contact with gas entering the first conduit.

According to an aspect of the alternative embodiment a heat insulating jacket surrounds the heat source and particulate filter.

According to yet another aspect, a bypass conduit is connected in the exhaust conduit upstream of the first inlet of the heat exchanger and downstream of the first outlet of the heat exchanger, the bypass conduit having a valve controlled for selectively directing exhaust gas into the heat exchanger or to avoid the heat exchanger.

According to another aspect of the invention, the apparatus further comprises a catalytic device for reducing nitrogen oxides connected in the conduit downstream of the heat exchanger. An injector may be mounted to the conduit upstream of the catalytic device for injecting a reductant into the exhaust gas. The catalytic device may be a selective catalytic reduction apparatus.

According to yet another aspect of the invention, the apparatus further comprises a slip catalyst device connected in the conduit downstream of the catalytic device for reducing nitrogen oxides.

An ammonia sensor may be mounted in the conduit downstream of the slip catalyst device and used to control the slip catalyst.

According to the invention, the heat source may be a diesel oxidation catalyst device, a burner device connectable to a fuel source, or an electrical heating device.

The particulate filter may include a catalytic coating for converting NO to NO2. Alternatively, or in addition, a heat source configured as a diesel oxidation catalyst may include a catalytic coating for converting NO to NO2. As yet another alternative, a single device may be provided combining the particulate filter, catalytic coating for converting NO to NO2, and the diesel oxidation catalyst functions.

BRIEF DESCRIPTION OF THE DRAWINGS

The invention will be better understood by reference to the following detailed description read in conjunction with the appended drawings, in which.

DETAILED DESCRIPTION

Figure 1:
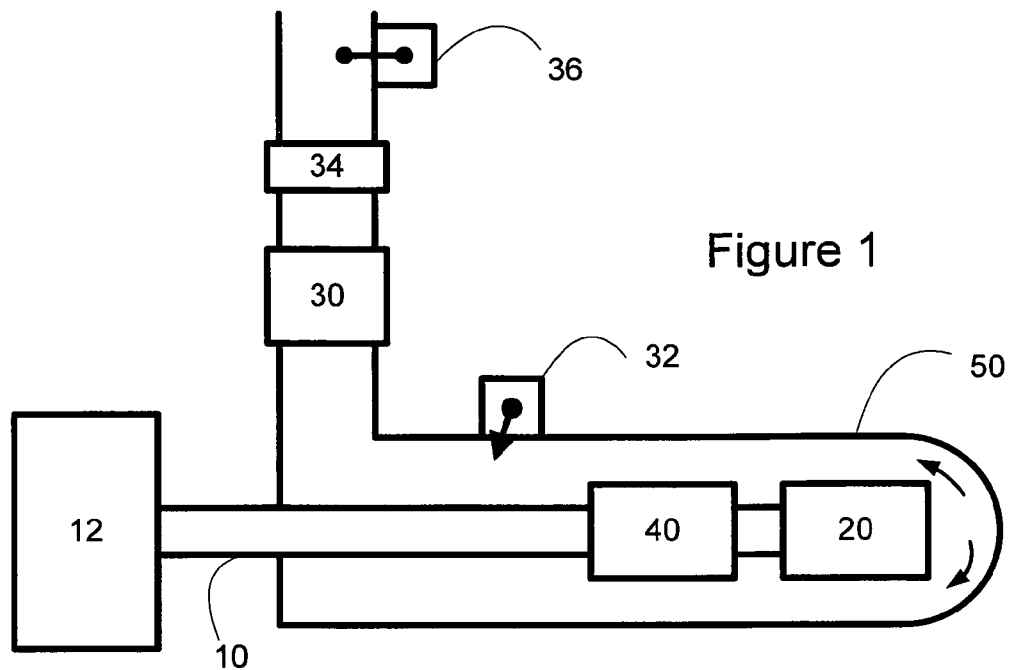
FIG. 1 illustrates a first embodiment the invention including a heat source and particulate filter positioned in a reverse flow conduit, wherein exhaust gas exiting the particulate filter transfers heat to the particulate filter and exhaust gas exiting the engine but prior to entering the particulate filter; and, FIG. 2 illustrates an additional embodiment in which a heat exchanger is disposed downstream of the particulate filter to use exhaust gas exiting the particulate filter to heat exhaust gas exiting the engine but prior to entering the particulate filter.

An apparatus according to the invention is connected by a conduit or pipe 10 to receive exhaust gas from a diesel engine 12. The apparatus includes a diesel particulate filter 20 (DPF) to trap and remove particulate matter from the exhaust flow.

As is known, DPF devices must be regenerated to avoid excessive accumulation of particulate matter in the device. To avoid removing the DPF for cleaning, it is convenient to regenerate the DPF in place by burning or oxidizing the particulate matter. When the engine is operated at high load, the temperature of the exhaust gas exiting the engine may be sufficiently high to cause burning of the particulate matter in the DPF, particularly if the DPF includes a catalytic coating for converting NO in the exhaust stream to $NO_2$ to facilitate $NO_2$ based regeneration of the particulate matter. To ensure proper regeneration temperatures, according to one embodiment of the invention, a heat source 40 is provided upstream of the DPF to heat the exhaust gas when regeneration is needed but the engine is not producing exhaust at sufficiently high temperatures for DPF regeneration. The heat source may be embodied as a burner heating device. Alternatively, the heat source may be embodied as an electrical heating device.

According to another embodiment, rather than a heating device, the heat source component 40 may be a diesel oxidation catalyst (DOC) connected in the exhaust conduit upstream of the DPF. The DOC may be configured with a catalyst to oxidize hydrocarbons, and a hydrocarbon (e.g., diesel fuel) injector is located upstream of the DOC to inject hydrocarbon into the exhaust gas flow. The injected hydrocarbon is oxidized in the DOC, which produces heat that raises the temperature of the exhaust gas for aiding combustion of the particulate matter accumulated in the DPF.

The DOC may also be configured by appropriate catalytic coatings to convert a portion of the NO in the engine exhaust to $NO_2$. As is known, $NO_2$ reacts with the particulate matter in the DPF to oxidize the particulate matter, which regenerates the DPF.

According to yet another embodiment, the DOC function and the DPF function may be configured in a single device, for example, a DPF having a catalytic coating for NO conversion to $NO_2$. This embodiment may also include an additional heat source mounted upstream to ensure that the exhaust gas stream is at a temperature sufficiently high to produce the oxidation of the particulate matter. The heat source may be used also to provide sufficient heat for the burning of particulate matter for more complete regeneration.

According to yet another aspect of the invention, the apparatus may include a heat exchanger to recuperate heat from the particulate oxidation reaction to heat the exhaust gas entering the DOC and/or DPF. According to one embodiment illustrated in FIG. 1, the heat exchanger is embodied as a pipe 50 surrounding and enclosing the DOC and DPF, receiving and reversing the flow of exhaust exiting the DPF, as indicated by the arrows, for counterflow to the inlet of the DOC and a portion of the exhaust conduit leading to the DOC. The enclosing pipe 50 carries the heated gas over the exterior of the DPF, the DOC, and the enclosed portion of the conduit to heat those devices from the exterior while the oxidation reaction adds heat from the interior. This has the advantageous effect in the DPF of creating a more even radial temperature gradient, leading to more effective regeneration.

Figure 2:
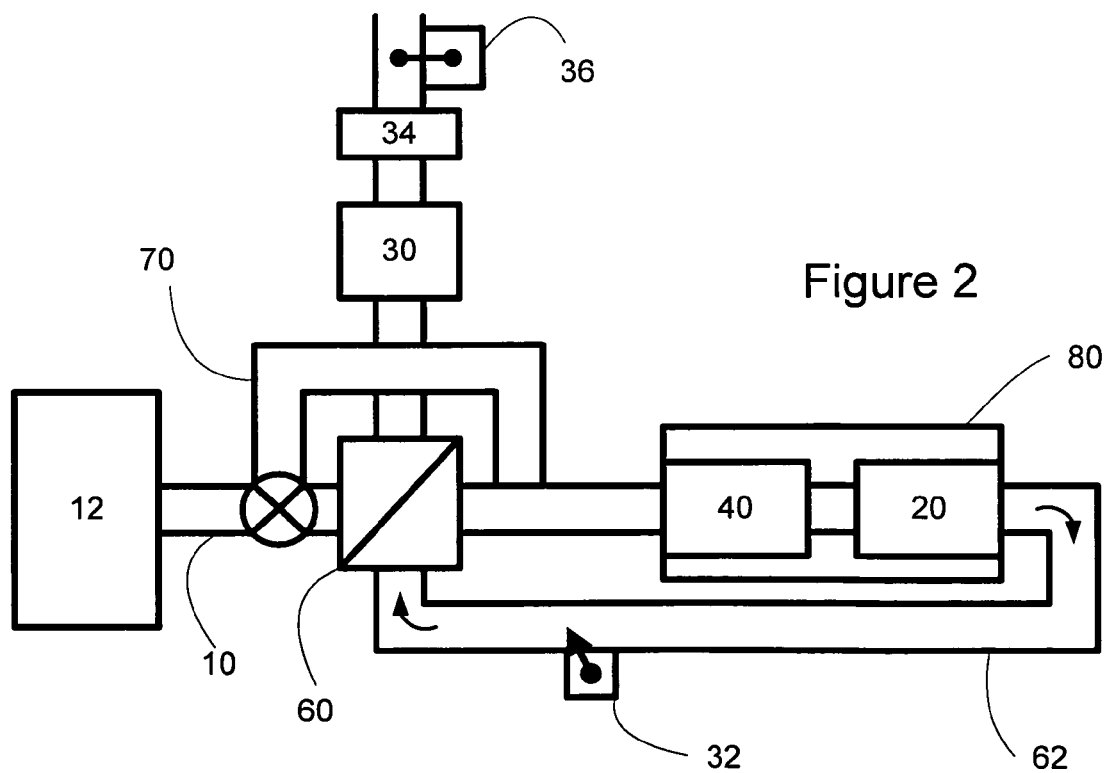

Alternatively, as illustrated in FIG. 2, the heat exchanger may be embodied as a separate device 60 connected upstream of the DOC or DPF and connected to a pipe 62 carrying the exhaust gas from the outlet of the DPF 20. Heated gas exiting the DPF and entering the heat exchanger heats exhaust gas from the engine upstream of the DOC or DPF inlet, recovering heat from the regeneration process to help ensure that the temperature of the gas entering the DPF is at a sufficiently high temperature.

After a cold engine start, the heat exchanger may delay the DPF from reaching normal operating temperatures because the engine exhaust will be heating the heat exchanger, and thus losing heat before it reaches the DPF. To mitigate this situation, the invention provides a bypass 70 of the heat exchanger which can be opened after a cold start to divert exhaust gas around the heat exchanger directly to the DPF (and/or DOC). Once the engine reaches normal operating temperature, the bypass is closed to direct exhaust gas through the heat exchanger for operation as described above.

According to yet another alternative of the invention, the heat exchanger 60 is configured to operate also as a DOC and/or a NO catalyst. In this embodiment, the cold side of the heat exchanger, that is, the side receiving exhaust gas from the engine, includes catalytic material for converting NO to $NO_2$ coating the interior surfaces. Alternatively, the cold side could include a coating for diesel oxidation. These embodiments would help heat the exhaust gas for particulate filter regeneration. The hot side, that is the side receiving gas looped back from the outlet of the particulate filter, is configured as a $NO_x$ catalyst. In this embodiment, the $NO_x$ conversion device, the SCR or other device, is disposed downstream of the combined heat exchanger, with a urea injection device upstream of the NO conversion device or upstream of the catalyst coated heat exchanger as mentioned above.

In the embodiment of FIG. 2, it is advantageous to insulate the DOC and DPF by providing an insulating jacket 80 or other device to avoid heat loss from the DPF, thus helping to maintain the DPF at an effective temperature for oxidation of the particulate matter. It is advantageous also to insulate the pipe 62 carrying exhaust gas from the outlet of the particulate filter 20 to the heat exchanger 60.

Referring now to both FIG. 1 and FIG. 2, downstream of the DPF, a $NO_x$ conversion device 30 may be provided, which, for example, may comprise a zeolite catalyst, a lean $NO_x$ catalyst, or selective catalytic reduction (SCR) device. A device 32 for injecting a reductant, a hydrocarbon and carbon monoxide, urea or ammonia, as appropriate to the $NO_x$ conversion catalyst, is disposed downstream of the DPF and upstream of the $NO_x$ conversion device 30. In the NOx conversion device, the reductant reacts with the NO and $NO_2$ to convert it to $N_2$ and water.

Optionally, in the case of an ammonia or urea active catalyst as the NOx conversion device 30, a slip catalyst 34 may be disposed downstream of the NOx conversion device to convert ammonia that may pass through the NOx conversion device, before the ammonia exits to the atmosphere.

Alternatively, an ammonia sensor 36 may be disposed downstream of the NOx conversion device and connected to the urea injection system to control the amount of urea injected for conversion. For example, the urea injection system will use the signal to lower the amount of urea injection in iterative control until any slip ammonia is at or below acceptable levels.

According to yet another alternative, both a slip catalyst and an ammonia sensor may be disposed downstream of the NOx conversion device. The ammonia sensor may be advantageously located downstream of the slip catalyst. By this placement, the sensor may be used to ensure that the exhaust gases are within acceptable levels of ammonia release.

The invention has been described in terms of preferred embodiments, principles, and components; however, those skilled in the art will recognize that substitution of equivalents may be made without departing from the scope of the invention as defined in the following claims.

What is claimed is:

1. An apparatus for treating engine exhaust gas, comprising:
   an exhaust conduit for leading exhaust gases from an engine to an exhaust outlet;
   a particulate filter connected in the exhaust conduit to receive exhaust gas;
   a heat source connected in the exhaust conduit upstream of the particulate filter;
   a heat exchanger connected to receive exhaust gas exiting the particulate filter, the heat exchanger comprising a housing having a first inlet to receive exhaust gas from the engine and a first outlet connected to the exhaust conduit upstream of the heat source, and having second inlet to receive exhaust gas exiting the particulate filter and a second outlet connected to the exhaust conduit leading to the exhaust outlet, the heat exchanger configured to put the exhaust gas entering the second inlet in heat transfer contact with gas entering the first conduit, the heat exchanger being disposed upstream of and spaced from the heat source and particulate filter; and,
   a bypass conduit connected in the exhaust conduit upstream of the first inlet of the heat exchanger and downstream of the first outlet of the heat exchanger, the bypass conduit having a valve controlled for selectively directing exhaust gas into the heat exchanger or to the exhaust conduit downstream of the first outlet, bypassing the heat exchanger.

2. The apparatus as claimed in claim 1, wherein a first passage of the heat exchanger connecting the first inlet and the first outlet includes a catalytic coating for converting NO to NO2.

3. The apparatus as claimed in claim 1, wherein a first passage of the heat exchanger connecting the first inlet and the first outlet includes a catalytic coating for oxidizing hydrocarbons.

4. The apparatus as claimed in claim 1, further comprising a heat insulating jacket surrounding the heat source and particulate filter.

5. The apparatus as claimed in claim 1, further comprising a heat insulating jacket surrounding a conduit carrying exhaust gas from the particulate filter to the heat exchanger.

6. The apparatus as claimed in claim 1, wherein the heat source is a diesel oxidation catalyst device.

7. The apparatus as claimed in claim 1, further comprising a catalytic device for reducing nitrogen oxides connected in the exhaust conduit downstream of the second outlet of the heat exchanger.

8. The apparatus as claimed in claim 7, further comprising an ammonia sensor mounted in the conduit downstream of the catalytic device for reducing nitrogen oxides, the ammonia sensor being connected to a control device for the injector and producing a signal responsive to an amount of ammonia present in the exhaust gas.

9. The apparatus as claimed in claim 7, further comprising a slip catalyst device connected in the conduit downstream of the catalytic device for reducing nitrogen oxides.

10. The apparatus as claimed in claim 7, wherein the catalytic device is a selective catalytic reduction apparatus.

* * * * *